Figure 2:
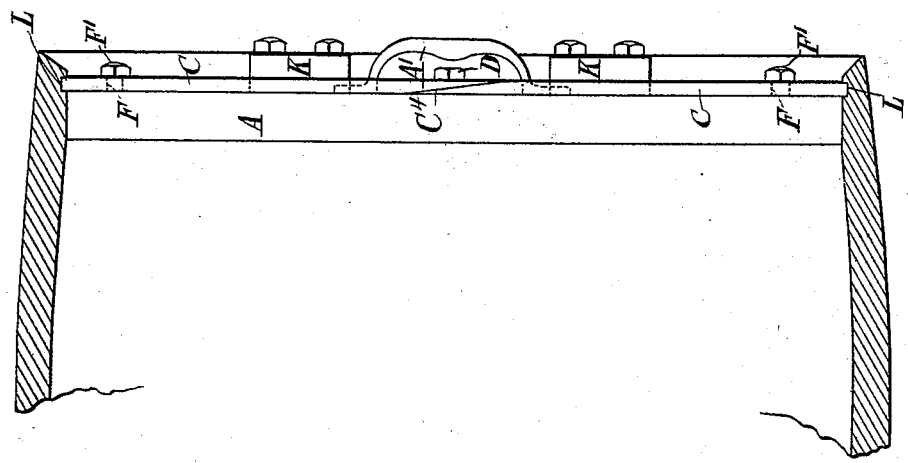

(No Model.) 2 Sheets—Sheet 1.

G. POWELL.
SECURING HEADS OF CASKS, DRUMS, &c.

No. 532,248. Patented Jan. 8, 1895.

Witnesses:
H. K. Boulter
C. G. Northup

Inventor:
George Powell,
By Wm. E. Boulter,
Attorney

THE NORRIS PETERS CO., PHOTO-LITHO., WASHINGTON, D. C.

(No Model.) 2 Sheets—Sheet 2.
G. POWELL.
SECURING HEADS OF CASKS, DRUMS, &c.
No. 532,248. Patented Jan. 8, 1895.
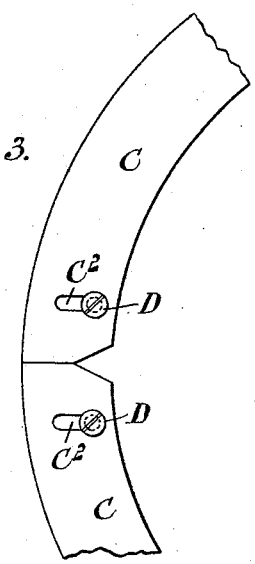
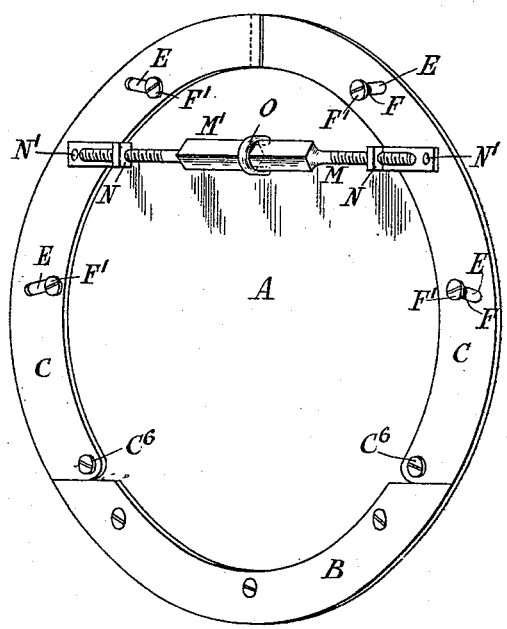

UNITED STATES PATENT OFFICE.

GEORGE POWELL, OF LONDON, ENGLAND.

SECURING HEADS OF CASKS, DRUMS, &c.

SPECIFICATION forming part of Letters Patent No. 532,248, dated January 8, 1895.

Application filed February 20, 1894. Serial No. 500,828. (No model.)

*To all whom it may concern:*

Be it known that I, GEORGE POWELL, a subject of the Queen of England, residing at Homerton, London, Middlesex, England, have invented certain new and useful Improvements in or Relating to Securing the Heads of Casks, Drums, and the Like, of which the following is a specification.

This invention relates to the means employed for securing the head of a cask, drum or similar vessel. This is now usually effected in the case of casks by removing some of the hoops and allowing the staves to expand, inserting the head and replacing the hoops, or in the case of drums by flanging the end or cover, placing it in or upon the drum and securing it by rivets or the like.

In carrying out my invention I prefer to proceed as follows:

I provide the cask, drum or other vessel, with an annular recess or groove more or less similar to the groove usually provided in casks, though the holding face or chine of the groove instead of being on the slant as is usual with casks may if desired be perpendicular or nearly so to the axis of the cask. I form the cover or head of a size to just pass the rim or chine of this groove and upon the head I provide a ring or band of any suitable material, say for example, wrought iron. A portion or segment of this band say about one-third of it may be screwed or otherwise rigidly secured to the head or in case of an iron head it may be a portion of the same metal. The other two-thirds or parts may be of about equal length jointed together with what I may term a rule joint, but the bolt or pin upon which they turn is fastened into the head and instead of a hole in the two parts to be joined I provide a slot and instead of making an ordinary halved and butt joint I can if I like make the whole joint on the slant like a scarf joint. Each of the movable segments may be provided with one or more oblique slots through which pass bolts or equivalent secured in the head. I further prefer to employ two pawls or detents one for each segment, and to provide the inner periphery of the segment with a suitable number of, say three, notches into one of which the detent may fit as required. This arrangement is convenient in case the cask should shrink or expand with the weather, and it also facilitates the proper fixing of the head even should the cask to which it be applied be not quite a proper fit; also the head may have one or more stops or fulcrum blocks each adapted to act as a fulcrum for a lever whose free end would engage with a suitable recess or recesses in each of the segments.

The operation is as follows:—When the head is fixed the segments are forced outward by the lever or other suitable means, so that they engage with the groove in the cask, and pawls or detents holding them out in that position. Other means such as screw-bolts or the like, may, if preferred, be employed for this purpose or the bolts in the slots may be screwed home and thus fix the segments. In undoing the segments and freeing the head a lever may be applied against one of the fulcrum blocks and engaged with one of the segments so as to relieve the detent which can then be turned out of the way, and the same with the other segments. The segments being freed, the pressure of the lever can be applied in the opposite direction so as to force the segments inward, their free ends rising upon the fixed segment by reason of these joints also being on an incline, and when they are moved sufficiently far inward the head will be free and can be lifted out by means of a handle provided for the purpose.

Although I have described the two movable segments as jointed together it would be sufficient if they merely touch provided suitable slots are formed to accommodate holding bolts and the segments are cut away where necessary to allow of their free movement. The segments need not overlap unless desired.

Figure 1:
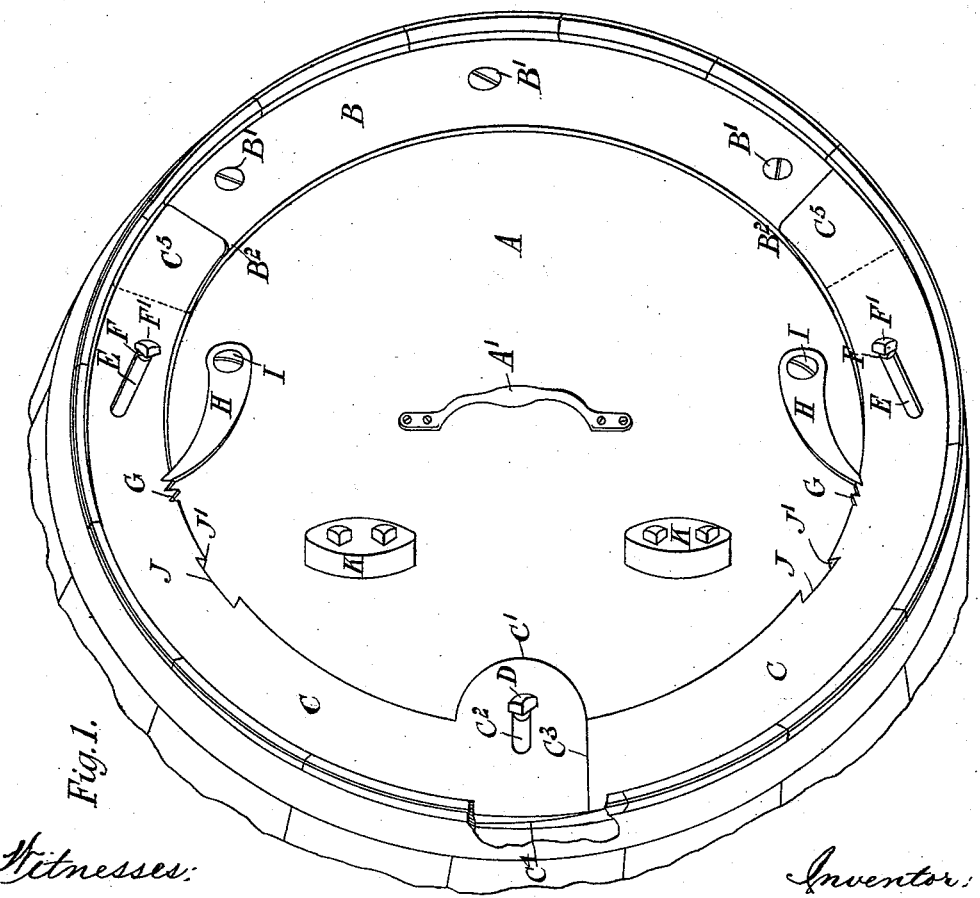

In the accompanying drawings Figure 1 is a view showing the end of a cask fitted with this device. Fig. 2 shows a section of a portion of a cask with the head and fittings in full; Fig. 3, an alternative form of a portion of the device shown in Figs. 1 and 2, and Fig. 4 is a perspective view of a modification.

Like letters represent like parts in all figures.

A is the cask head which may be fitted with a handle A' for convenience in handling it.

B is the fixed portion or segment of the iron or other ring secured in any convenient manner, say by screws or bolts B', to the head A.

C are movable segments of the ring, of which B is the fixed segment, jointed together at C' by a suitable joint, preferably in the form of a rule-joint, but instead of a round hole and pin fixed in the joint a slot $C^2$ passing through both parts C is employed, through which passes a bolt or pin D secured in the head A. The two parts of the joint C' may be halved together and butted at $C^3$ like an ordinary rule-joint, but I prefer to make the two portions overlap at an angle like a scarf joint, as shown at $C^4$ in Fig. 2 and also in Fig. 1 where a portion of the cask stave is shown broken away to exhibit this feature. Such a joint is preferable as the whole fitting is necessarily of a rough character, and the joint can be more easily made and roughly fitted in this manner. The segments C need not however be jointed together at all, but may be each adjustably secured to the cask head A by a screw, bolt or equivalent D passing through a slot $C^2$ as shown in Fig. 3.

Each segment C has one or more oblique slots E through each of which extends a bolt or pin F secured in the cask head and having a head or nut F' so that the segment C cannot slip off. At the point of meeting of the segments C and B I prefer to bevel both portions again like scarf joints as shown at $C^5$ and $B^2$ Fig. 1 so that when the ring is collapsed the ends of the segments C may rise up upon the segment B. The same result may be secured by leaving the space between the segments C and B so as to allow of the former moving up when the ring is collapsed.

Each segment C is provided with a suitable number of notches or ratchet teeth G with which engage pawls or detents H pivoted upon bolts or screws I to the cask-head A. The object of this arrangement is to retain the segments C in their expanded condition so as to hold the cask-head firmly in the cask.

A recess J, the ends J' of which may with advantage be undercut, is provided in each segment C and a fulcrum block K is secured in a suitable position upon the head A.

In the arrangement shown in Fig. 4 the two segments C are pivoted to the cask head A by the screws $C^6$ or equivalent and are provided with guiding slots E and headed pins or screws F F'. The two segments C are connected together by means of a right and left handed screwed rod M M' of which the portion M' is square or of other convenient form to enable it to be turned by means of a spanner or equivalent. The screwed ends M of rod M M' engage with nuts N pivoted as at N' to the segments C. The rod M M' is retained in a central position by means of a pin, staple or equivalent O fixed to the cask-head and engaging with a groove in the rod M M' or the two segments C may be adjustably connected together in any other convenient manner.

The operation of the devices shown in Figs. 1, 2, and 3 is as follows:—Supposing the head to be fixed in the cask as indicated in Fig. 1 the end of any suitable lever, say a prizing-bar or other suitable iron rod or equivalent, is inserted in the recess J and a purchase being obtained upon the appropriate fulcrum block K the segment C expanded sufficiently to allow the pawl H to be removed from the notch G in which it has been inserted. The segment C is then relieved from pressure and can be moved as required. A similar operation is conducted with the second segment C or the releasing of the first segment would probably sufficiently slacken the second to allow of the pawl H being turned back. The segments being released are pulled inward toward the center of the cask-head (to facilitate which any suitable handles, knobs, or holds may be provided upon or in the segments) the ends $C^5$ mounting the ends $B^2$ of the fixed segment B, the fitting between the bolt heads F' and the segments C being sufficiently loose to allow of this. The diameter of the cask-head is sufficiently small to allow it to freely pass into or out of a groove L in the end of the cask so that, when the ring has been collapsed by the inward movement of the segments C, the cask-head can be withdrawn from the cask, the fixed segment, whose periphery is shaped to the diameter of the groove L, extending only for about one-third of the whole circle being easily withdrawn with the head.

To replace the head it is placed into the groove L the segment B fitting therein. Then the prizing-bar or lever is placed against the fulcrum-block K with its end in the recess J of one of the segments C which is forced out and the pawl H engaged with its appropriate notch G and a similar operation conducted with reference to the second segment C, the head being then securely fastened in the cask.

The two segments C shown in Fig. 4 are moved outward for engaging with the groove L or inward for disengaging therewith by means of the screwed rod M M' as will be well understood without further description.

I claim—

1. The combination with a cask or drum-head of a segment fixedly secured thereto, segments adapted to be moved independently of the fixed segment and of each other, each of said movable segments having an inclined slot, headed bolts secured to the drum-head and passing through said slots, the ends of the movable segments overlapping and adapted to ride over the ends of the fixed segment and each of the movable segments having recesses or notches in its inner edge, bearing blocks on the drum-head adjacent to said recesses, and pawls pivoted to the drum-head and adapted to engage said notches, as and for the purpose specified.

2. The combination with a cask or drum-head of a segment fixedly secured thereto, segments adapted to be moved independently of the fixed segment and of each other, each of said movable segments having an inclined slot, headed bolts secured to the drum-head and passing through said slots and means for moving the movable segments and holding them in their adjusted positions, as and for the purpose specified.

In testimony whereof I have hereto set my hand before the two subscribing witnesses.

GEORGE POWELL.

Witnesses:
ALFRED J. BOULT,
HARRY B. BRIDGE.